United States Patent
Sridhar et al.

(10) Patent No.: US 11,646,777 B2
(45) Date of Patent: May 9, 2023

(54) DETECTING STATIC CHANNELS

(71) Applicant: QUALCOMM Incorporated, San Diego, CA (US)

(72) Inventors: Abhinav Sridhar, Boston, MA (US); Paolo Minero, La Jolla, CA (US); Yongle Wu, San Diego, CA (US); Ashok Mantravadi, San Diego, CA (US); Hari Sankar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/246,361

(22) Filed: Apr. 30, 2021

(65) Prior Publication Data
US 2022/0352946 A1 Nov. 3, 2022

(51) Int. Cl.
| | |
|---|---|
| H04B 7/06 | (2006.01) |
| H04B 17/318 | (2015.01) |
| H04L 25/02 | (2006.01) |
| H04W 24/10 | (2009.01) |
| H04B 7/08 | (2006.01) |
| H04W 84/12 | (2009.01) |

(52) U.S. Cl.
CPC ......... *H04B 7/0626* (2013.01); *H04B 7/0632* (2013.01); *H04B 7/088* (2013.01); *H04B 17/318* (2015.01); *H04L 25/0204* (2013.01); *H04L 25/0212* (2013.01); *H04W 24/10* (2013.01); *H04W 84/12* (2013.01)

(58) Field of Classification Search
CPC .... H04B 7/0626; H04B 7/0632; H04B 7/088; H04B 17/318; H04L 25/0204; H04L 25/0212; H04W 24/10; H04W 84/12
See application file for complete search history.

(56) References Cited

U.S. PATENT DOCUMENTS

| | | | |
|---|---|---|---|
| 2003/0157892 A1* | 8/2003 | Reznik | H04B 1/70754 375/E1.032 |
| 2008/0225936 A1* | 9/2008 | Hong | H04L 25/0202 375/230 |

(Continued)

FOREIGN PATENT DOCUMENTS

WO WO-2013159595 A1 * 10/2013 .......... H04W 52/146

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a wireless communication device may determine, based at least in part on two or more measurements on a channel taken at different points in time, that the channel is classified as static. The wireless communication device may perform at least one optimization based at least in part on determining that the channel is classified as static. For example, the at least one optimization may include modifying a channel state feedback procedure, reducing a periodicity associated with a measurement gap, modifying a filtering associated with measurements of the channel, reducing a threshold associated with beam switching, and/or refraining from performing at least one filtering at a radio frequency receiver of the wireless communication device. Numerous other aspects are described.

30 Claims, 7 Drawing Sheets

(56) References Cited

U.S. PATENT DOCUMENTS

| | | | |
|---|---|---|---|
| 2014/0098907 A1* | 4/2014 | Eliaz | H04L 25/03038 |
| | | | 375/295 |
| 2019/0246301 A1* | 8/2019 | Gheorghiu | H04B 17/0082 |
| 2019/0364408 A1* | 11/2019 | Park | H04J 11/00 |
| 2020/0343985 A1* | 10/2020 | O'Shea | H04B 17/3911 |
| 2021/0036727 A1* | 2/2021 | Kilian | H04B 1/1027 |
| 2022/0140918 A1* | 5/2022 | Mellein | H04B 17/0085 |
| | | | 370/252 |
| 2022/0247506 A1* | 8/2022 | Park | H04B 7/00 |

* cited by examiner

DETECTING STATIC CHANNELS

FIELD OF THE DISCLOSURE

Aspects of the present disclosure generally relate to wireless communication and to techniques and apparatuses for detecting static channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a wireless communication device includes a memory and one or more processors coupled to the memory, the memory and the one or more processors configured to determine, based at least in part on two or more measurements on a channel taken at different points in time, that the channel is classified as static; and perform at least one optimization based at least in part on determining that the channel is classified as static.

In some aspects, a wireless communication device includes a memory and one or more processors coupled to the memory, the memory and the one or more processors configured to receive, from an additional wireless communication device, an indication that a channel, between the wireless communication device and the additional wireless communication device, is classified as static; and perform at least one optimization based at least in part on the indication that the channel is classified as static.

In some aspects, a method of wireless communication performed by a wireless communication device includes determining, based at least in part on two or more measurements on a channel taken at different points in time, that the channel is classified as static; and performing at least one optimization based at least in part on determining that the channel is classified as static.

In some aspects, a method of wireless communication performed by a wireless communication device includes receiving, from an additional wireless communication device, an indication that a channel, between the wireless communication device and the additional wireless communication device, is classified as static; and performing at least one optimization based at least in part on the indication that the channel is classified as static.

In some aspects, a non-transitory computer-readable medium storing a set of instructions for wireless communication includes one or more instructions that, when executed by one or more processors of a wireless communication device, cause the wireless communication device to determine, based at least in part on two or more measurements on a channel taken at different points in time, that the channel is classified as static; and perform at least one optimization based at least in part on determining that the channel is classified as static.

In some aspects, a non-transitory computer-readable medium storing a set of instructions for wireless communication includes one or more instructions that, when executed by one or more processors of a wireless communication device, cause the wireless communication device to receive, from an additional wireless communication device, an indication that a channel, between the wireless communication device and the additional wireless communication device, is classified as static; and perform at least one optimization based at least in part on the indication that the channel is classified as static.

In some aspects, an apparatus for wireless communication includes means for determining, based at least in part on two or more measurements on a channel taken at different points in time, that the channel is classified as static; and means for performing at least one optimization based at least in part on determining that the channel is classified as static.

In some aspects, an apparatus for wireless communication includes means for receiving, from an additional wireless communication device, an indication that a channel, between the wireless communication device and the additional wireless communication device, is classified as static; and means for performing at least one optimization based at least in part on the indication that the channel is classified as static.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
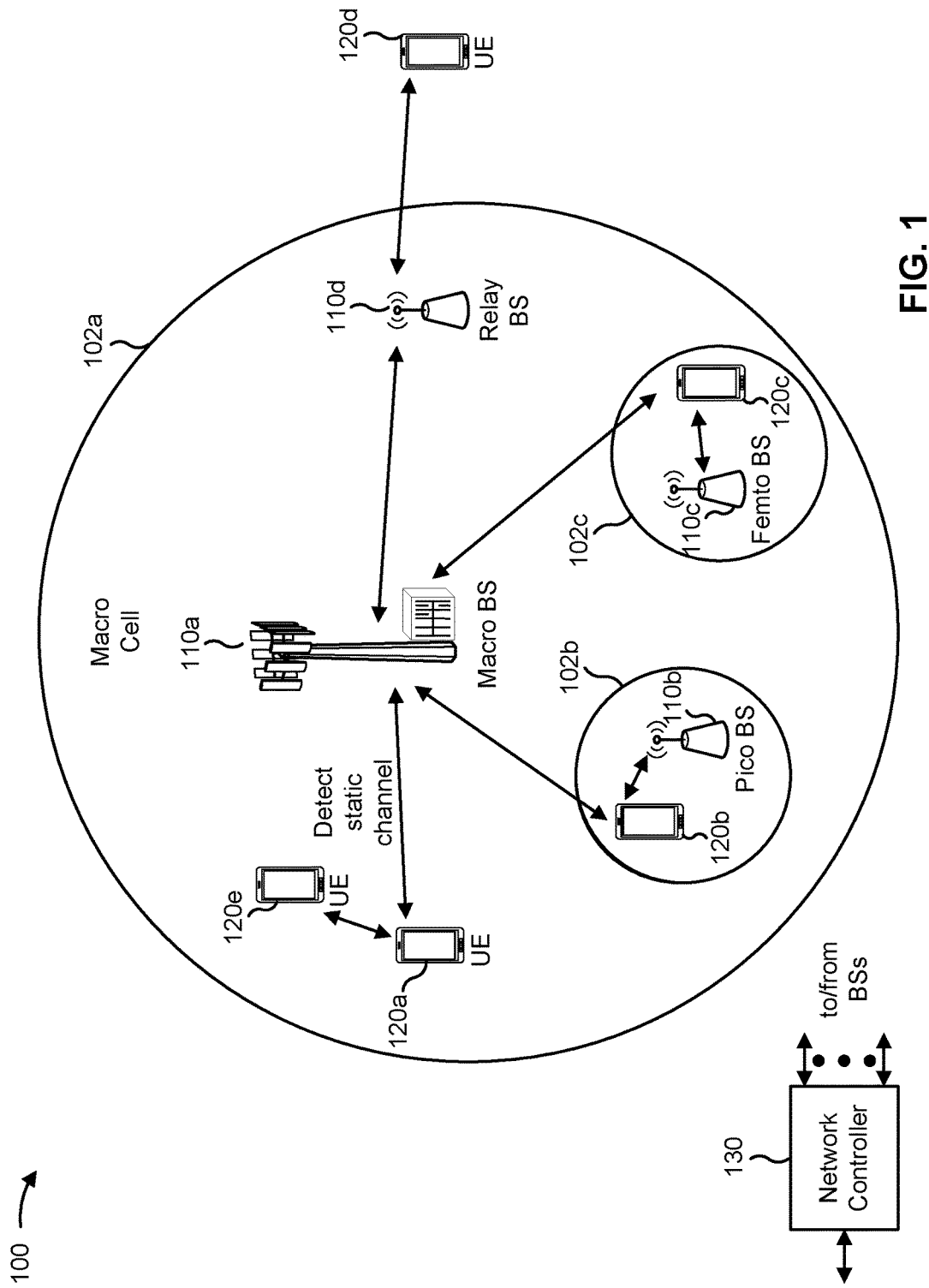
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, a UE (e.g., UE 120*a*) may detect a static channel with a BS (e.g., BS 110*a*). Although described with respect to the UE 120*a*, the description similarly applies to other wireless communication devices, such as an independent basic service set (IBSS) node, a peer-to-peer (P2P) node, a neighbor aware network (NAN) node, an access point (AP) in a wireless local area network (WLAN) (e.g., a WLAN according to the Institute of Electrical and Electronics Engineers (IEEE) Local Area Network/Metropolitan Area Network (LAN/MAN) Standards Committee's 802.11 standards, also referred to as "IEEE 802.11 protocols"), a station (STA) in WLAN, and/or another device that communicates wirelessly over-the-air (OTA). Similarly, although described with respect to the BS 110*a*, the description similarly applies to other wireless communication devices, such as an IBSS node, a P2P node, a NAN node, an AP in a WLAN, an STA in a WLAN, and/or another device that communicates wirelessly OTA.

By detecting the static channel, the UE 120*a* may apply one or more optimizations internally (e.g., to reduce power consumption and/or conserve processing resources), as described below in connection with FIG. 3. Additionally, or alternatively, the UE 120*a* may report the static channel to the BS 110*a* such that the BS 110*a* may apply one or more optimizations. For example, the BS 110*a* may reduce a periodicity associated with a measurement gap, modify a filtering associated with measurements of the channel, and/or reduce a threshold associated with beam switching, as described below in connection with FIG. 3. Accordingly, the BS 110*a* may conserve network resources, conserve processing resources, and/or improve quality, reliability, and/or throughput on the channel. Additionally, or alternatively, the UE 120*a* may modify a report that is transmitted to the BS 110*a* based at least in part on detecting the static channel. For example, the UE 120*a* may modify a channel state feedback (CSF) procedure, as described below in connection with FIG. 3. Accordingly, the UE 120a may improve quality, reliability, and/or throughput on the channel.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using P2P communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
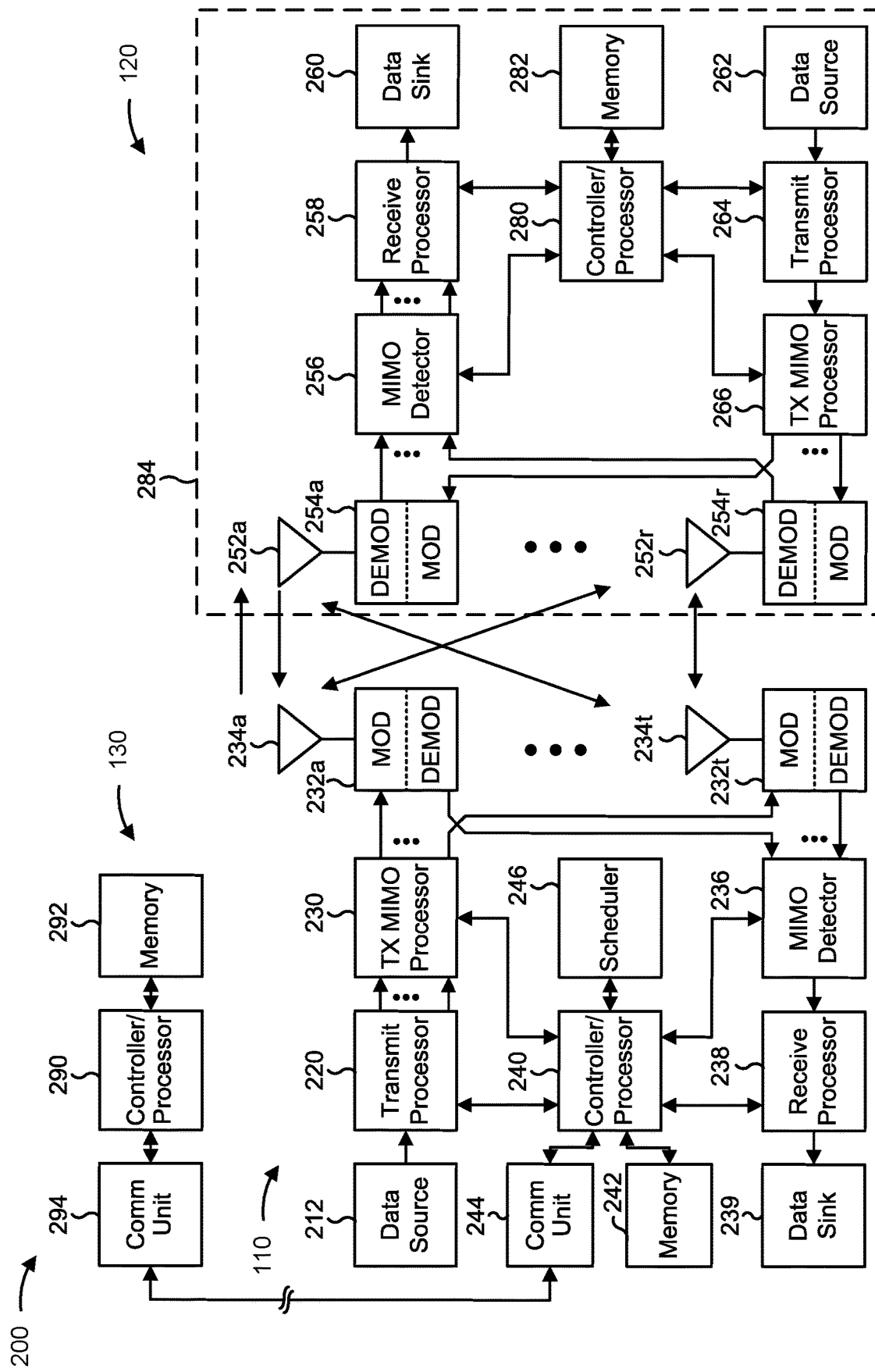
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 3-5).

Controller/processor 240 of base station 110, controller/processor 280 of UE 120, and/or any other component(s) of FIG. 2 may perform one or more techniques associated with detecting static channels, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples. In some aspects, the wireless communication device described herein is the base station 110, is included in the base station 110, or includes one or more components of the base station 110 shown in FIG. 2. In other aspects, the wireless communication device described herein is the UE 120, is included in the UE 120, or includes one or more components of the UE 120 shown in FIG. 2.

In some aspects, a wireless communication device (e.g., the UE 120 and/or apparatus 600 of FIG. 6) may include means for determining, based at least in part on two or more measurements on a channel taken at different points in time, that the channel is classified as static; and/or means for performing at least one optimization based at least in part on determining that the channel is classified as static. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a wireless communication device (e.g., the base station 110 and/or apparatus 700 of FIG. 7) may include means for receiving, from an additional wireless communication device (e.g., the UE 120 and/or apparatus 600 of FIG. 6), an indication that a channel, between the wireless communication device and the additional wireless communication device, is classified as static; and/or means for performing at least one optimization based at least in part on the indication that the channel is classified as static. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some techniques and apparatuses described herein enable a UE (e.g., UE 120) and/or another wireless communication device to detect a static channel with a base station (e.g., base station 110) and/or another wireless communication device. As a result, the UE 120 (and/or the base station 110) may apply one or more optimizations based at least in part on detecting the static channel. For example, the UE 120 and/or the base station 110 may determine a mobility associated with the UE 120 (and/or with a network including the base station 110, such as a non-terrestrial network) based at least in part on detection of the static channel. As a result, the UE 120 and/or the base station 110 tracks the mobility more accurately, which allows the UE 120 and/or the base station 110 to provision better handover of the UE 120 between cells and thus reduce downtime for the UE 120. Additionally, or alternatively, the UE 120 may modify a report that is transmitted to the base station 110, based at least in part on detection of the static channel. For example, the UE 120 may report a different CQI when detecting a static channel as compared with a CQI that is reported when detecting a non-static channel. As a result, the base station 110 selects a higher transport block size (TBS), MCS, and/or another transmission configuration associated with the channel in order to increase throughput, quality, and/or reliability.

Additionally, or alternatively, the UE 120 may perform one or more optimizations internally based at least in part on detecting the static channel. For example, the UE 120 may reduce a periodicity associated with a measurement gap for the base station 110, which conserves processing resources and power. In another example, the UE 120 may modify a filtering associated with measurements of the channel, which conserves processing resources and power. In another example, the UE 120 may reduce a periodicity associated with a control loop, which is associated with time, frequency, and/or power adjustments, which conserves processing resources and power. In another example, the UE 120 may refrain from performing at least one filtering at an RF receiver of the UE 120, which conserves processing resources and power. In another example, the UE 120 may reduce a threshold associated with beam switching. As a result, the UE 120 switches beams more aggressively in order to improve quality and/or reliability of communications with the base station 110.

Additionally, or alternatively, the UE 120 may report detection of the static channel to the base station 110, and the base station 110 may perform one or more optimizations based at least in part on the detection of the static channel. For example, the base station 110 may reduce a periodicity associated with a measurement gap for the base station 110, which conserves network resources as well as processing resources and power at the base station 110. In another example, the base station 110 may modify a filtering associated with measurements of the channel, which conserves processing resources and power at the UE 120. In another example, the base station 110 may reduce a threshold associated with beam switching. As a result, the UE 120 switches beams more aggressively in order to improve quality and/or reliability of communications with the base station 110.

Figure 3:
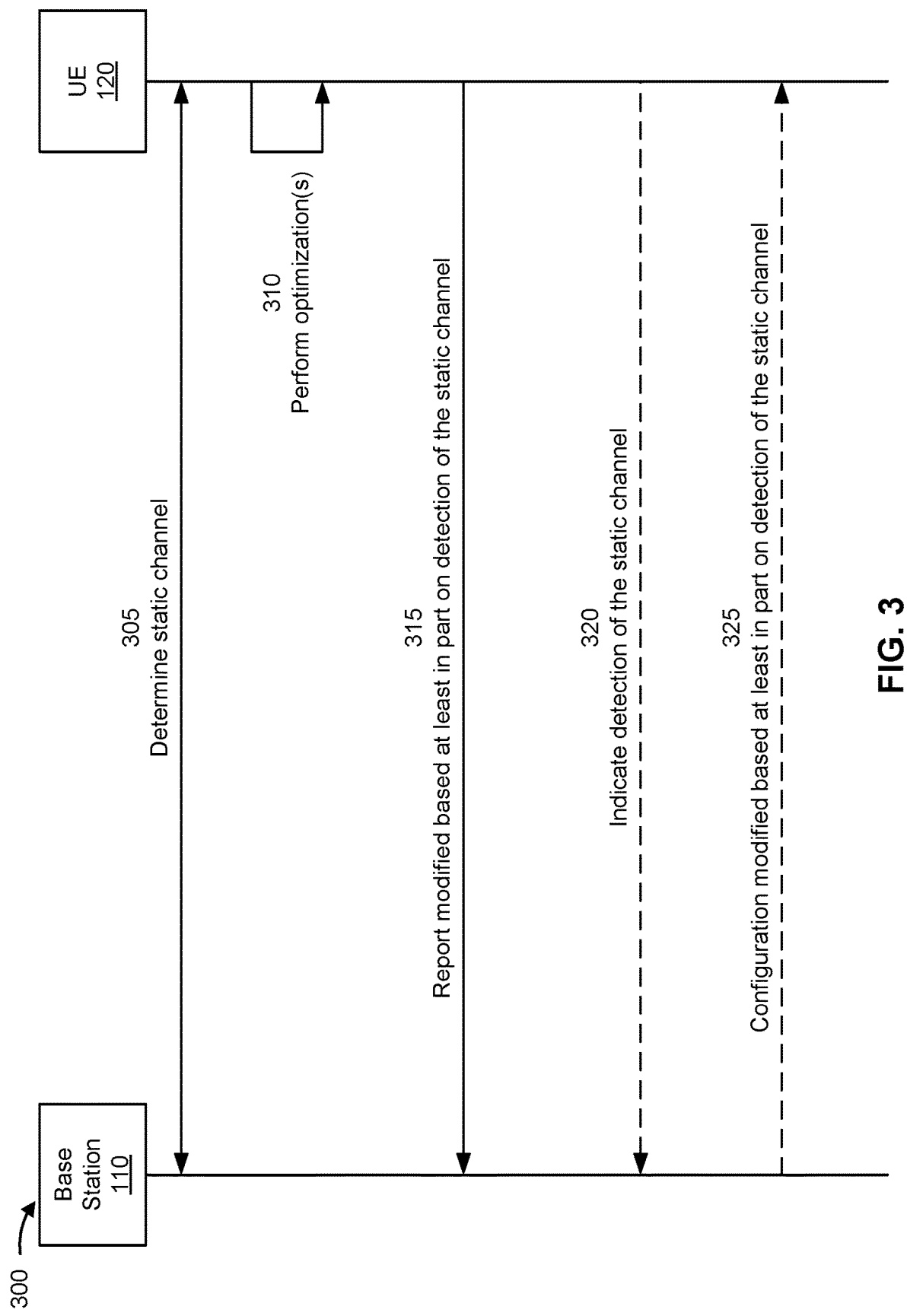
FIG. 3 is a diagram illustrating an example associated with detecting static channels, in accordance with the present disclosure.

FIG. 3 is a diagram illustrating an example 300 associated with detecting static channels, in accordance with the present disclosure. As shown in FIG. 3, a base station 110 and a UE 120 may communicate with one another. Although described below using the UE 120, the description similarly applies to an IBSS node, a P2P node, a NAN node, an AP in a WLAN, an STA in a WLAN, and/or another wireless communication device (e.g., apparatus 600 of FIG. 6). Additionally, or alternatively, although described below using the base station 110, the description similarly applies to an IBSS node, a P2P node, a NAN node, an AP in a WLAN, an STA in a WLAN, and/or another wireless communication device (e.g., apparatus 700 of FIG. 7). In some aspects, the base station 110 and the UE 120 may be included in a wireless network, such as network 100 of FIG. 1. As an alternative, the base station 110 and the UE 120 may otherwise communicate wirelessly OTA (e.g., according to WLAN standards, such as the IEEE 802.11 protocols).

As shown in connection with reference number 305, the UE 120 may determine, based at least in part on two or more measurements on a channel (e.g., a channel between the UE 120 and the base station 110) taken at different points in time, that the channel is classified as static. For example, the two or more measurements include RSRP measurements, RSSI measurements, signal-to-noise ratios (SNRs), signal-to-interference-and-noise ratios (SINRs), signal-to-noise-and-distortion ratios (SNDRs), and/or other L1 and/or higher-layer measurements. In some aspects, the UE 120 may select the two or more measurements based at least in part on a time window. For example, the UE 120 may not select any measurements older than a threshold amount of time (e.g., taken more than 5 seconds ago, 10 seconds ago, 11 seconds ago, and so on).

In some aspects, classification as static may be associated with an additive white Gaussian noise (AWGN) model, and classification as not static may be associated with a tapped delay line (TDL) channel model. Accordingly, the UE 120 may use different decoding schemes for the AWGN model or the TDL channel model, respectively.

In some aspects, the UE 120 may determine that the channel is classified as static based at least in part on a variance associated with the two or more measurements. For example, the UE 120 may classify the channel as static when the variance satisfies a threshold (e.g., a threshold of 1 dBm, 2 dBm, and so on) and may classify the channel as not static when the variance does not satisfy the threshold. In some aspects, the UE 120 may determine the variance associated with the two or more measurements using a Welford filter. For example, the UE 120 may determine the variance using expressions similar to the following forms:

$$\overline{x_n} = \overline{x_{n-1}} + \frac{x_n - \overline{x_{n-1}}}{n}$$

and $$s_n^2 = s_{n-1}^2 + \frac{(x_n - \overline{x_{n-1}})^2}{n} - \frac{s_{n-1}^2}{n-1},$$

where n represents a quantity of measurements included in the two or more measurements, $x_n$ represents the most recent measurement, $x_{n-1}$ represents a previous measurement, $\overline{x_n}$ represents a mean calculated using the most recent measurement, $\overline{x_{n-1}}$ represents a mean calculated before the most recent measurement (e.g., using the previous measurement $x_{n-1}$), $s_n$ represents a variance associated with the most recent measurement $x_n$, and $s_{n-1}$ represents a variance associated with the previous measurement $x_{n-1}$.

As an alternative, the UE 120 may determine the variance associated with the two or more measurements using an infinite impulse response (IIR) filter. For example, the UE 120 may determine the variance using expressions similar to the following forms:

$$\overline{x_n} = \alpha \cdot \overline{x_{n-1}} + (1-\alpha) \cdot x_n$$

and $$s_n^2 = \alpha \cdot s_{n-1}^2 + (1-\alpha) \cdot (x_n - \overline{x_{n-1}})^2,$$

where $\alpha$ represents a coefficient governing the output, $x_n$ represents the most recent measurement, $x_{n-1}$ represents a previous measurement, $\overline{x_n}$ represents a mean calculated using the most recent measurement, $\overline{x_{n-1}}$ represents a mean calculated before the most recent measurement (e.g., using the previous measurement $x_{n-1}$), $s_n$ represents a variance associated with the most recent measurement $x_n$, and $s_{n-1}$ represents a variance associated with the previous measurement $x_{n-1}$.

In another example, the UE 120 may determine the variance using expressions similar to the following forms:

$$\overline{x_n} = \alpha \cdot \overline{x_{n-1}} + (1-\alpha) \cdot x_n,$$

$$w_n^2 = \alpha \cdot w_{n-1}^2 + (1-\alpha) \cdot x_n^2,$$

and $$s_n^2 = w_{n-1}^2 - \overline{x_{n-1}}^2,$$

where α represents a feedforward coefficient governing the output, $x_n$ represents the most recent measurement, $x_{n-1}$ represents a previous measurement, $\overline{x}_n$ represents a mean calculated using the most recent measurement, $\overline{x}_{n-1}$ represents a mean calculated before the most recent measurement (e.g., using the previous measurement $x_{n-1}$), $s_n$ represents a variance associated with the most recent measurement $x_n$, $w_n$ represents a feedback coefficient associated with the most recent measurement $x_n$, and $w_{n-1}$ represents a feedback coefficient associated with the previous measurement $x_{n-1}$.

In any of the aspects described above, the UE 120 may determine the variance associated with the two or more measurements using a sliding window. For example, the UE 120 may use only the most recent 32 measurements, 64 measurements, 65 measurements, and so on, to determine the variance. Accordingly, the UE 120 may conserve processing resources used to determine the variance and improve accuracy of static channel detection by using a sliding window.

Additionally, or alternatively, in any of the aspects described above, the UE 120 may determine the variance associated with the two or more measurements using a hysteresis loop. For example, the UE 120 may adjust incoming measurements according to a filter such that a single measurement does not alter the classification of the channel. This allows the UE 120 to account for erroneous measurements while still classifying the channel accurately according to changes in the measurements (e.g., as reflected in the determined variance). Accordingly, the UE 120 may improve accuracy of static channel detection by using a hysteresis loop.

As shown in connection with reference number 310, the UE 120 may perform at least one optimization based at least in part on determining that the channel is classified as static. For example, the UE 120 may adjust one or more hardware components (e.g., as described above in connection with FIG. 2) and/or may adjust one or more software operations based at least in part on classification of the channel as static.

In some aspects, the at least one optimization may include reducing a periodicity associated with a measurement gap based at least in part on determining that the channel is classified as static. For example, the UE 120 may instruct a physical layer of the UE 120 (e.g., antenna 252, demodulator 254, MIMO detector 256, and/or receive processor 258, as described above in connection with FIG. 2) to skip at least one measurement gap (e.g., configured by the base station 110) based at least in part on classification of the channel as static. By refraining from measuring at least one reference signal, generating a report based at least in part on the measuring, and transmitting the report to the base station 110, the UE 120 conserves processing resources and power.

Additionally, or alternatively, the at least one optimization may include reducing a periodicity associated with a control loop, which is associated with at least one of a time adjustment, a frequency adjustment, or a power adjustment, based at least in part on determining that the channel is classified as static. For example, the UE 120 may instruct a physical layer of the UE 120 (e.g., antenna 252, demodulator 254, MIMO detector 256, and/or receive processor 258, as described above in connection with FIG. 2) to update timing, frequency, and/or power less frequently based at least in part on classification of the channel as static. In some aspects, the UE 120 may instruct the physical layer to tune one or more hardware components (e.g., antennas, power amplifiers, demodulators, and/or other similar components) according to timing, frequency, and/or power settings less frequency when the channel is classified as static as compared with when a channel is classified as not static. By reducing the periodicity for the control loop, the UE 120 conserves processing resources and power.

Additionally, or alternatively, the at least one optimization includes modifying a filtering, associated with measurements of the channel, based at least in part on determining that the channel is classified as static. For example, the UE 120 may instruct a physical layer of the UE 120 (e.g., antenna 252, demodulator 254, MIMO detector 256, and/or receive processor 258, as described above in connection with FIG. 2) not to use L3 filtering for channel state information (CSI) reports or to use a smaller coefficient in L3 filtering for CSI reports, based at least in part on classification of the channel as static. In some aspects, the UE 120 may ignore a coefficient specified in filterCoefficientRSRP and/or filterCoefficientRSRQ, as defined in 3GPP specifications and/or another standard. As an alternative, the UE 120 may use a smaller coefficient than specified in filterCoefficientRSRP and/or filterCoefficientRSRQ. By refraining from using L3 filtering, or even by using a smaller coefficient, the UE 120 conserves processing resources and power.

Additionally, or alternatively, the at least one optimization includes reducing a threshold associated with beam switching based at least in part on determining that the channel is classified as static. For example, the UE 120 may instruct a higher layer, such as a medium access control (MAC) layer, of the UE 120 (e.g., MIMO detector 256, receive processor 258, and/or controller/processor 280, as described above in connection with FIG. 2) to use a reduced threshold to determine when to switch beams, based at least in part on classification of the channel as static. For example, the UE 120 may switch beams when a new beam is associated with an RSRP and/or another measurement that is 1 dB higher than a corresponding measurement associated with a current beam, instead of using a threshold of 2 dB when a channel is determined as not static. By more aggressively switching beams, the UE 120 can increase quality and/or reliability of communications with the base station 110.

Additionally, or alternatively, the at least one optimization includes refraining from performing at least one filtering, at a radio frequency receiver of the UE 120, based at least in part on determining that the channel is classified as static. For example, the UE 120 may instruct a physical layer of the UE 120 (e.g., antenna 252, demodulator 254, MIMO detector 256, and/or receive processor 258, as described above in connection with FIG. 2) to bypass one or more hardware filters (e.g., a bandpass filter) and/or one or more software filters (e.g., a surface acoustic wave (SAW) filter), based at least in part on classification of the channel as static. By refraining from at least one filtering, the UE 120 conserves processing resources and power.

Additionally, or alternatively, the at least one optimization may include determining a mobility associated with the UE 120 based at least in part on determining that the channel is classified as static. For example, the UE 120 may indicate classification of the channel as static to an access and mobility function (AMF) (e.g., via non-access stratum (NAS) signaling) and/or another function that manages mobility of the UE 120. As a result, the AMF may track mobility of the UE 120 with increased accuracy. Accordingly, handover of the UE 120 from one cell to another cell (or to another base station from the base station 110, within the same cell) can be faster and result in less downtime for the UE 120 on the downlink and/or the uplink. Although described above with respect to mobility of the UE 120, the mobility may additionally or alternatively be determined with respect to mobility of the network including the base station 110 (e.g., when the network is non-terrestrial).

Additionally, or alternatively, the at least one optimization may include modifying a CSF procedure based at least in part on determining that the channel is classified as static. Accordingly, as shown in connection with reference number 315, the UE 120 may modify a report that is transmitted to the base station 110 based at last in part on classification of the channel as static. For example, the UE 120 may select a different CQI than a CQI selected when a channel is classified as not static. By selecting a higher CQI, the base station 110 may configure a larger TBS for the channel, a higher MCS for the channel, and/or otherwise adjust a configuration associated with the channel to increase throughput to the UE 120 and/or increase quality and/or reliability of communications with the UE 120. In some aspects, the different CQI is selected using a different preconfigured table than a preconfigured table used when a channel is classified as not static. For example, 3GPP specifications and/or another standard may include at least two tables with which the UE 120 is programmed (and/or otherwise preconfigured) such that the UE 120 uses one table (e.g., with higher CQI selections) when the channel is classified as static and a different table (e.g., with lower CQI selections) when a channel is classified as not static.

Additionally, or alternatively, and as shown in connection with reference number 320, the UE 120 may transmit, and the base station 110 may receive, an indication that the channel is classified as static. In some aspects, the UE 120 may transmit the indication as part of a CSI report or separately therefrom.

Accordingly, the base station 110 may perform at least one optimization based at least in part on the indication that the channel is classified as static. For example, and as shown in connection with reference number 325, the base station 110 may adjust a configuration associated with the channel and/or a configuration associated with the UE 120 based at least in part on classification of the channel as static.

In some aspects, the at least one optimization may include reducing a periodicity associated with a measurement gap based at least in part on the indication that the channel is classified as static. For example, the base station 110 may transmit a configuration, associated with the measurement gap, that includes a longer period as compared with a configuration, associated with the measurement gap, that would be transmitted when a channel is classified as not static. By reducing the periodicity, the base station 110 conserves network overhead, processing resources, and power by transmitting at least one reference signal associated with the measurement gap less frequently. Additionally, the base station 110 may cause the UE 120 to conserve processing resources and power by measuring less frequency and may conserve network overhead by reducing how frequently the UE 120 transmits reports based at least in part on measurements taken during the measurement gap.

Additionally, or alternatively, the at least one optimization may include modifying a filtering, associated with measurements of the channel, based at least in part on the indication that the channel is classified as static. For example, the base station 110 may indicate not to use L3 filtering for CSI reports or to use a smaller coefficient in L3 filtering for CSI reports, based at least in part on classification of the channel as static. In some aspects, the base station 110 may specify no coefficient in filterCoefficientRSRP and/or filterCoefficientRSRQ, as defined in 3GPP specifications and/or another standard. As an alternative, the base station 110 may specify a smaller coefficient in filterCoefficientRSRP and/or filterCoefficientRSRQ, as compared with a coefficient specified when a channel is classified as not static. By refraining from using L3 filtering, or even by using a smaller coefficient, the base station 110 causes the UE 120 to conserve processing resources and power.

Additionally, or alternatively, the at least one optimization may include reducing a threshold associated with beam switching based at least in part on the indication that the channel is classified as static. For example, the base station 110 may indicate a reduced threshold to determine when to switch beams, as compared with a threshold used when a channel is classified as not static. For example, the base station 110 may instruct the UE 120 to switch beams when a new beam is associated with an RSRP and/or another measurement that is 1 dB higher than a corresponding measurement associated with a current beam, instead of using a threshold of 2 dB when a channel is determined as not static. By causing the UE 120 to more aggressively switch beams, the base station 110 can increase quality and/or reliability of communications with the UE 120.

Additionally, or alternatively, the at least one optimization may include determining a mobility associated with the UE 120 based at least in part on determining that the channel is classified as static. For example, the base station 110 may indicate classification of the channel as static to an AMF and/or another function that manages mobility of the UE 120. As a result, the AMF may track mobility of the UE 120 with increased accuracy. Accordingly, handover of the UE 120 from one cell to another cell (or to another base station from the base station 110, within the same cell) can be faster and result in less downtime for the UE 120 on the downlink and/or the uplink. Although described above with respect to mobility of the UE 120, the mobility may additionally or alternatively be determined with respect to mobility of the network including the base station 110 (e.g., when the network is non-terrestrial).

By using techniques as described in connection with FIG. 3, the UE 120 may perform one or more optimizations based at least in part on detecting the static channel. As a result, the UE 120 more accurately tracks mobility (e.g., associated with the UE 120 and/or the network including the base station 110), conserves processing resources and power, and/or improves quality and/or reliability of communications with the base station 110. Additionally, or alternatively, the UE 120 may report detection of the static channel to the base station 110, which performs one or more optimizations based at least in part on the detection of the static channel. As a result, the base station 110 more accurately tracks mobility (e.g., associated with the UE 120 and/or the network including the base station 110), conserves network overhead, conserves processing resources and power, increases throughput on the static channel, and/or improves quality and/or reliability of communications with the UE 120.

As indicated above, FIG. 3 is provided as an example. Other examples may differ from what is described with respect to FIG. 3.

Figure 4:
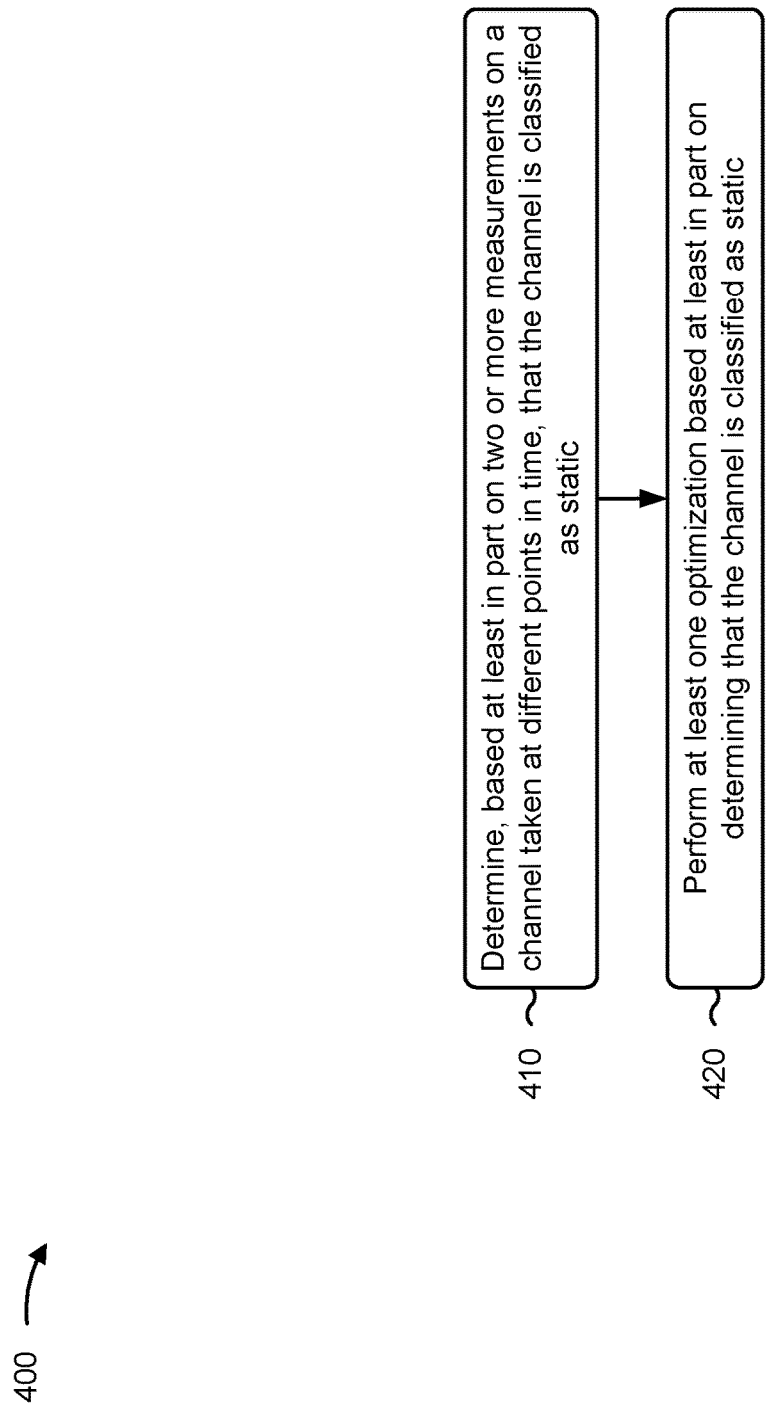
FIGS. 4 and 5 are diagrams illustrating example processes associated with detecting static channels, in accordance with the present disclosure.

FIG. 4 is a diagram illustrating an example process 400 performed, for example, by a wireless communication device, in accordance with the present disclosure. Example process 400 is an example where the wireless communication device (e.g., UE 120 and/or apparatus 600 of FIG. 6, among other examples) performs operations associated with detecting static channels.

As shown in FIG. 4, in some aspects, process 400 may include determining, based at least in part on two or more measurements on a channel taken at different points in time, that the channel is classified as static (block 410). For example, the wireless communication device (e.g., using determination component 608, depicted in FIG. 6) may determine, based at least in part on two or more measurements on a channel taken at different points in time, that the channel is classified as static, as described above.

As further shown in FIG. 4, in some aspects, process 400 may include performing at least one optimization based at least in part on determining that the channel is classified as static (block 420). For example, the wireless communication device (e.g., using determination component 608, using reception component 602, using transmission component 604, depicted in FIG. 6) may perform at least one optimization based at least in part on determining that the channel is classified as static, as described above.

Process 400 may include additional aspects, such as any single aspect or any combination of aspects described below and/or in connection with one or more other processes described elsewhere herein.

In a first aspect, the wireless communication device is included in a UE on a cellular network, an AP on a WLAN, an STA on a WLAN, or a combination thereof.

In a second aspect, alone or in combination with the first aspect, classification as static is associated with an AWGN model, and classification as not static is associated with a TDL channel model.

In a third aspect, alone or in combination with one or more of the first and second aspects, the two or more measurements include RSRP measurements.

In a third aspect, alone or in combination with one or more of the first and second aspects, determining that the channel is classified as static is based at least in part on a variance associated with the two or more measurements.

In a fourth aspect, alone or in combination with one or more of the first through third aspects, the variance associated with the two or more measurements is determined using a sliding window.

In a fifth aspect, alone or in combination with one or more of the first through fourth aspects, the variance associated with the two or more measurements is determined using a hysteresis loop.

In a sixth aspect, alone or in combination with one or more of the first through fifth aspects, the variance associated with the two or more measurements is determined using a Welford filter.

In a seventh aspect, alone or in combination with one or more of the first through sixth aspects, the variance associated with the two or more measurements is determined using an IIR filter.

In an eighth aspect, alone or in combination with one or more of the first through seventh aspects, the at least one optimization includes modifying (e.g., using determination component 608) a CSF procedure based at least in part on determining that the channel is classified as static.

In a ninth aspect, alone or in combination with one or more of the first through eighth aspects, modifying the CSF procedure comprises selecting (e.g., using determination component 608) a different CQI than a CQI selected when a channel is classified as not static.

In a tenth aspect, alone or in combination with one or more of the first through ninth aspects, the different CQI is selected using a different preconfigured table than a preconfigured table used when a channel is classified as not static.

In an eleventh aspect, alone or in combination with one or more of the first through tenth aspects, the at least one optimization includes reducing (e.g., using reception component 602) a periodicity associated with a measurement gap based at least in part on determining that the channel is classified as static.

In a twelfth aspect, alone or in combination with one or more of the first through eleventh aspects, the at least one optimization includes reducing (e.g., using reception component 602 and/or transmission component 604) a periodicity associated with a control loop, associated with at least one of a time adjustment, a frequency adjustment, or a power adjustment, based at least in part on determining that the channel is classified as static.

In a thirteenth aspect, alone or in combination with one or more of the first through twelfth aspects, the at least one optimization includes modifying (e.g., using reception component 602) a filtering, associated with measurements of the channel, based at least in part on determining that the channel is classified as static.

In a fourteenth aspect, alone or in combination with one or more of the first through thirteenth aspects, the at least one optimization includes determining (e.g., using determination component 608) a mobility associated with the wireless communication device based at least in part on determining that the channel is classified as static.

In a fifteenth aspect, alone or in combination with one or more of the first through fourteenth aspects, the at least one optimization includes reducing (e.g., using reception component 602 and/or determination component 608) a threshold associated with beam switching based at least in part on determining that the channel is classified as static.

In a sixteenth aspect, alone or in combination with one or more of the first through fifteenth aspects, the at least one optimization includes refraining (e.g., using reception component 602) from performing at least one filtering, at a radio frequency receiver, based at least in part on determining that the channel is classified as static.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
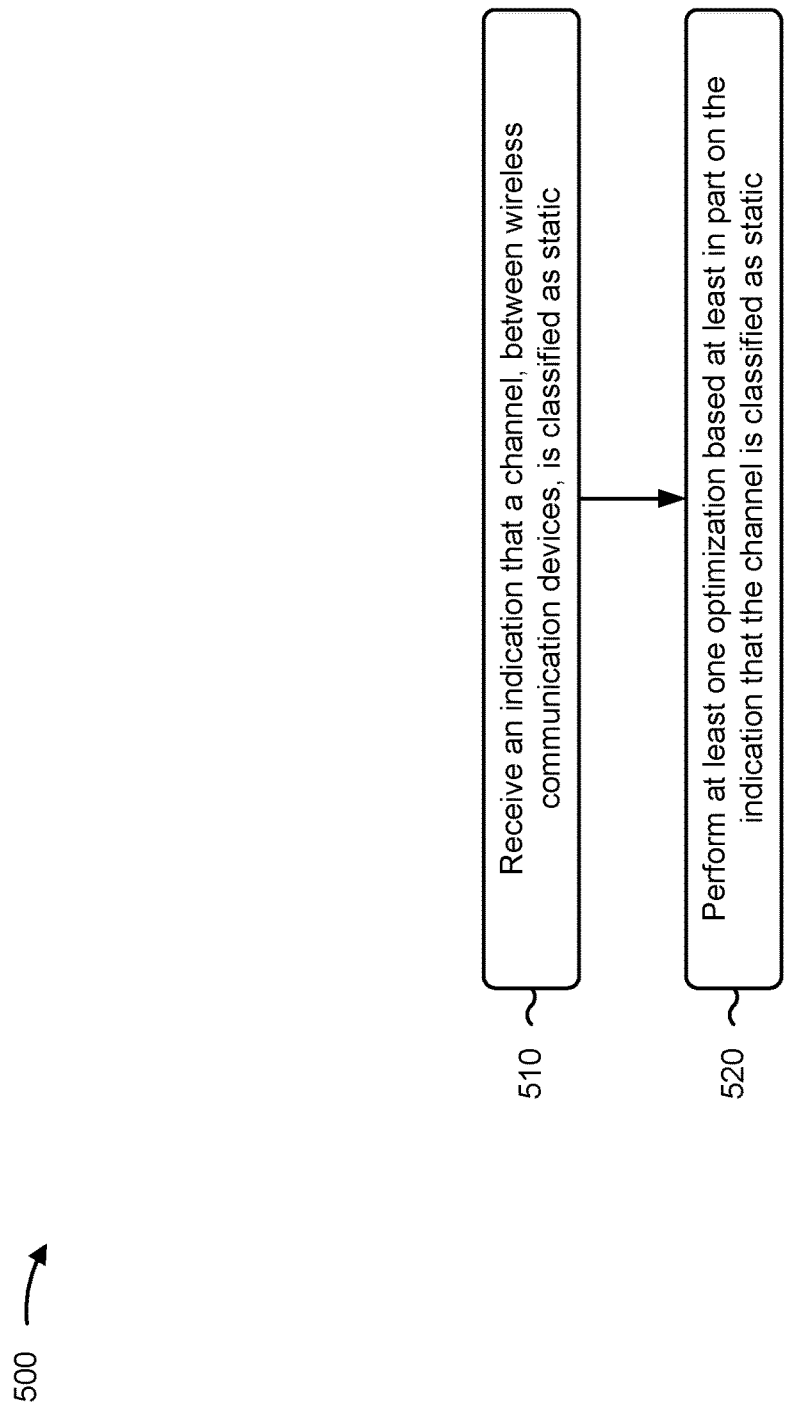

FIG. 5 is a diagram illustrating an example process 500 performed, for example, by a wireless communication device, in accordance with the present disclosure. Example process 500 is an example where the wireless communication device (e.g., base station 110 and/or apparatus 700 of FIG. 7, among other examples) performs operations associated with detecting static channels.

As shown in FIG. 5, in some aspects, process 500 may include receiving, from an additional wireless communication device (e.g., UE 120 and/or apparatus 600 of FIG. 6, among other examples), an indication that a channel, between the wireless communication device and the additional wireless communication device, is classified as static (block 510). For example, the wireless communication device (e.g., using reception component 702, depicted in FIG. 7) may receive an indication that a channel, between the wireless communication device and the additional wireless communication device, is classified as static, as described above.

As further shown in FIG. 5, in some aspects, process 500 may include performing at least one optimization based at least in part on the indication that the channel is classified as static (block 520). For example, the wireless communication device (e.g., using transmission component 704 and/or using mobility component 708, depicted in FIG. 7) may perform at least one optimization based at least in part on the indication that the channel is classified as static, as described above.

Process 500 may include additional aspects, such as any single aspect or any combination of aspects described below and/or in connection with one or more other processes described elsewhere herein.

In a first aspect, the wireless communication device includes a base station on a cellular network, an AP on a WLAN, an STA on a WLAN, or a combination thereof.

In a second aspect, alone or in combination with the first aspect, classification as static is associated with an AWGN model, and classification as not static is associated with a TDL channel model.

In a third aspect, alone or in combination with one or more of the first and second aspects, the at least one optimization includes reducing (e.g., using transmission component 704) a periodicity associated with a measurement gap based at least in part on the indication that the channel is classified as static.

In a fourth aspect, alone or in combination with one or more of the first through third aspects, the at least one optimization includes modifying (e.g., using transmission component 704) a filtering, associated with measurements of the channel, based at least in part on the indication that the channel is classified as static.

In a fifth aspect, alone or in combination with one or more of the first through fourth aspects, the at least one optimization includes determining (e.g., using mobility component 708) a mobility associated with the additional wireless communication device based at least in part on the indication that the channel is classified as static.

In a sixth aspect, alone or in combination with one or more of the first through fifth aspects, the at least one optimization includes reducing (e.g., using transmission component 704) a threshold associated with beam switching based at least in part on the indication that the channel is classified as static.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
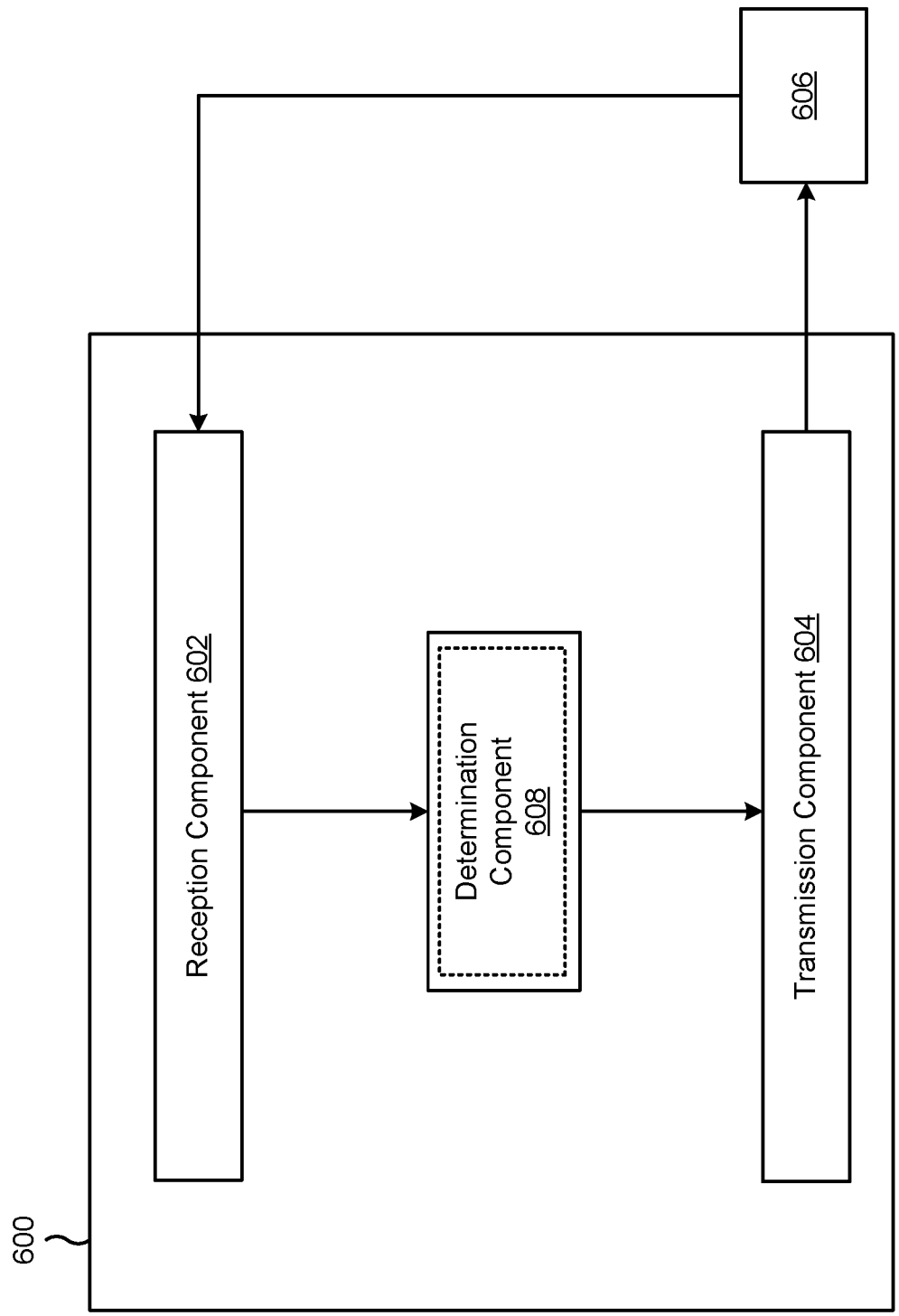
FIGS. 6 and 7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

In some aspects, the determination component 608 may determine, based at least in part on two or more measurements on a channel taken at different points in time, that the channel is classified as static. The determination component 608 may include a MIMO detector, a receive processor, a controller/processor, a memory, or a combination thereof, of the UE described above in connection with FIG. 2. Accordingly, the determination component 608, the reception component 602, and/or the transmission component 604 may perform at least one optimization based at least in part on the determination component 608 determining that the channel is classified as static.

In some aspects, the determination component 608 may modify a CSF procedure based at least in part on determining that the channel is classified as static. For example, the determination component 608 may select a different CQI than a CQI selected when a channel is classified as not static (e.g., using a different preconfigured table than a preconfigured table used when a channel is classified as not static). Additionally, or alternatively, the determination component 608 may determine a mobility associated with the apparatus 600 based at least in part on determining that the channel is classified as static.

Additionally, or alternatively, the reception component 602 may reduce a periodicity associated with a measurement gap based at least in part on the determination component 608 determining that the channel is classified as static. Additionally, or alternatively, the reception component 602 may modify a filtering, associated with measurements of the channel, based at least in part on the determination component 608 determining that the channel is classified as static. Additionally, or alternatively, the reception component 602 may refrain from performing at least one filtering based at least in part on the determination component 608 determining that the channel is classified as static.

Additionally, or alternatively, the reception component 602 and/or the transmission component 604 may reduce a periodicity associated with a control loop, associated with at least one of a time adjustment, a frequency adjustment, or a power adjustment, based at least in part on the determination component 608 determining that the channel is classified as static.

Additionally, or alternatively, the reception component 602 and/or determination component 608 may reduce a threshold associated with beam switching based at least in part on the determination component 608 determining that the channel is classified as static.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
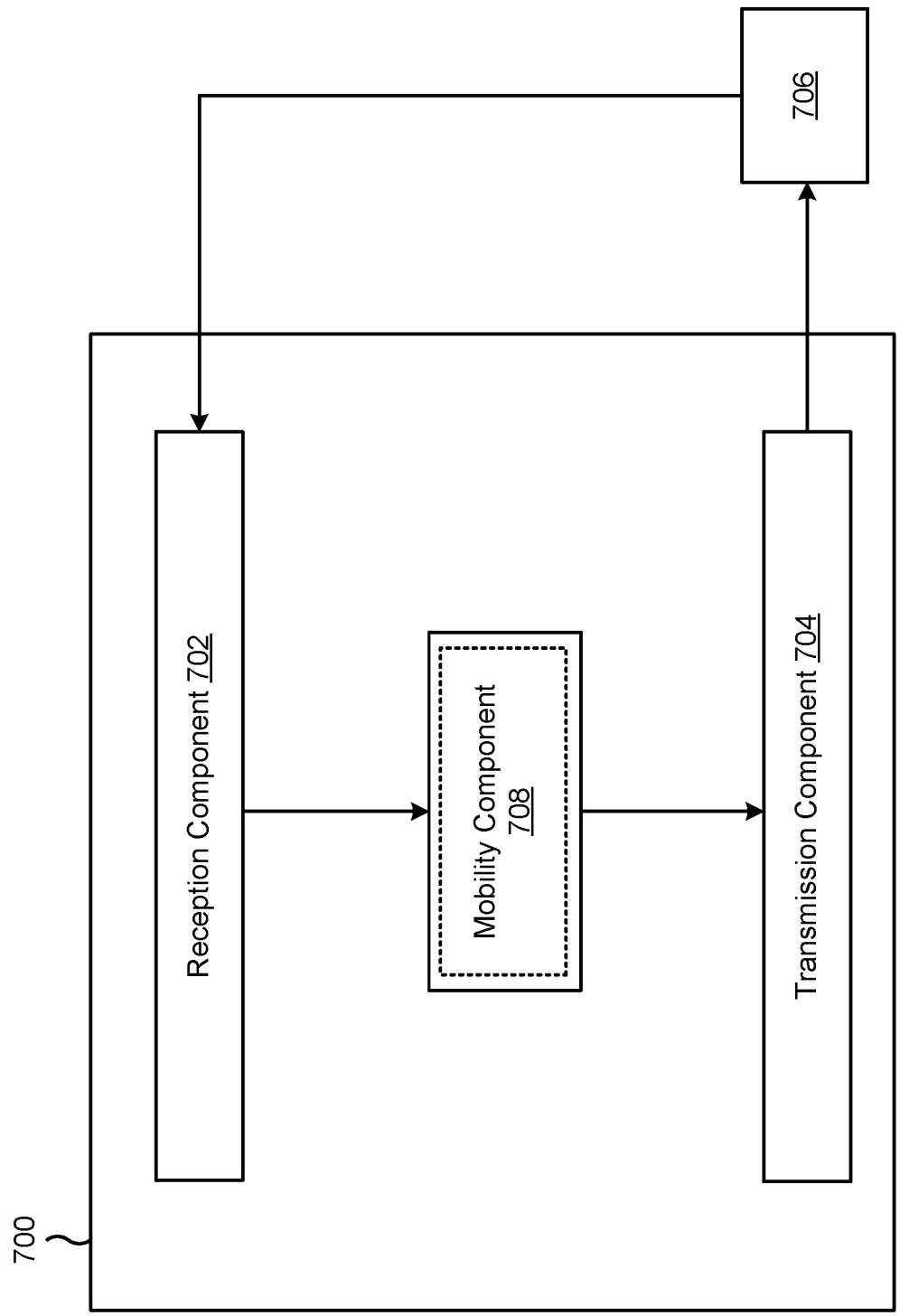

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a mobility component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

In some aspects, the reception component 702 may receive (e.g., from the apparatus 706) an indication that a channel (e.g., between the apparatus 700 and the apparatus 706) is classified as static. Accordingly, the transmission component 704 and/or the mobility component 708 may perform at least one optimization based at least in part on the indication that the channel is classified as static. The mobility component 708 may include a MIMO detector, a receive processor, a transmit MIMO processor, a transmit processor, a controller/processor, a memory, or a combination thereof, of the base station described above in connection with FIG. 2.

In some aspects, the transmission component 704 may reduce a periodicity associated with a measurement gap based at least in part on the reception component 702 receiving the indication that the channel is classified as static. For example, the transmission component 704 may transmit (e.g., to the apparatus 706) an indication of a longer period associated with the measurement gap as compared with a period indicated when a channel is classified as not static.

Additionally, or alternatively, the transmission component 704 may modify a filtering, associated with measurements of the channel, based at least in part on the reception component 702 receiving the indication that the channel is classified as static. For example, the transmission component 704 may transmit (e.g., to the apparatus 706) an indication of no filtering associated with measurements of the channel. As an alternative, the transmission component 704 may transmit (e.g., to the apparatus 706) an indication of a smaller coefficient, for filtering associated with measurements of the channel, as compared with a period indicated when a channel is classified as not static.

Additionally, or alternatively, the transmission component 704 may reduce threshold associated with beam switching based at least in part on the reception component 702 receiving the indication that the channel is classified as static. For example, the transmission component 704 may transmit (e.g., to the apparatus 706) an indication of a smaller threshold associated with beam switching as compared with a threshold indicated when a channel is classified as not static.

Additionally, or alternatively, the mobility component 708 may determine a mobility associated with the apparatus 706 based at least in part on the reception component 702 receiving the indication that the channel is classified as static. For example, the mobility component 708 may include an AMF and/or may communicate with an AMF (e.g., on a backhaul link) such that the indication is used in tracking mobility of the apparatus 706.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a wireless communication device, comprising: determining, based at least in part on two or more measurements on a channel taken at different points in time, that the channel is classified as static; and performing at least one optimization based at least in part on determining that the channel is classified as static.

Aspect 2: The method of Aspect 1, wherein the wireless communication device is included in a user equipment on a cellular network, an access point on a wireless local area network (WLAN), a station on a WLAN, or a combination thereof.

Aspect 3: The method of any of Aspects 1 through 2, wherein classification as static is associated with an additive white Gaussian noise (AWGN) model, and classification as not static is associated with a tapped delay line (TDL) channel model.

Aspect 4: The method of any of Aspects 1 through 3, comprising referencing signal received power (RSRP) measurements.

Aspect 5: The method of any of Aspects 1 through 4, wherein determining that the channel is classified as static is based at least in part on a variance associated with the two or more measurements.

Aspect 6: The method of Aspect 5, wherein the variance associated with the two or more measurements is determined using a sliding window.

Aspect 7: The method of any of Aspects 5 through 6, wherein the variance associated with the two or more measurements is determined using a hysteresis loop.

Aspect 8: The method of any of Aspects 5 through 7, wherein the variance associated with the two or more measurements is determined using a Welford filter.

Aspect 9: The method of any of Aspects 5 through 7, wherein the variance associated with the two or more measurements is determined using an infinite impulse response (IIR) filter.

Aspect 10: The method of any of Aspects 1 through 9, wherein the at least one optimization includes modifying a channel state feedback (CSF) procedure based at least in part on determining that the channel is classified as static.

Aspect 11: The method of Aspect 10, wherein modifying the CSF procedure comprises selecting a different channel quality indicator (CQI) than a CQI selected when a channel is classified as not static.

Aspect 12: The method of Aspect 11, wherein the different CQI is selected using a different preconfigured table than a preconfigured table used when a channel is classified as not static.

Aspect 13: The method of any of Aspects 1 through 12, wherein the at least one optimization includes reducing a periodicity associated with a measurement gap based at least in part on determining that the channel is classified as static.

Aspect 14: The method of any of Aspects 1 through 13, wherein the at least one optimization includes reducing a periodicity associated with a control loop, associated with at least one of a time adjustment, a frequency adjustment, or a power adjustment, based at least in part on determining that the channel is classified as static.

Aspect 15: The method of any of Aspects 1 through 14, wherein the at least one optimization includes modifying a filtering, associated with measurements of the channel, based at least in part on determining that the channel is classified as static.

Aspect 16: The method of any of Aspects 1 through 15, wherein the at least one optimization includes determining a mobility associated with the wireless communication device based at least in part on determining that the channel is classified as static.

Aspect 17: The method of any of Aspects 1 through 16, wherein the at least one optimization includes reducing a threshold associated with beam switching based at least in part on determining that the channel is classified as static.

Aspect 18: The method of any of Aspects 1 through 17, wherein the at least one optimization includes refraining from performing at least one filtering, at a radio frequency receiver, based at least in part on determining that the channel is classified as static.

Aspect 19: A method of wireless communication performed by a wireless communication device, comprising: receiving, from an additional wireless communication device, an indication that a channel, between the wireless communication device and the additional wireless communication device, is classified as static; and performing at least one optimization based at least in part on the indication that the channel is classified as static.

Aspect 20: The method of Aspect 19, wherein the wireless communication device includes a base station on a cellular network, an access point on a wireless local area network (WLAN), a station on a WLAN, or a combination thereof.

Aspect 21: The method of any of Aspects 19 through 20, wherein classification as static is associated with an additive white Gaussian noise (AWGN) model, and classification as not static is associated with a tapped delay line (TDL) channel model.

Aspect 22: The method of any of Aspects 19 through 21, wherein the at least one optimization includes reducing a periodicity associated with a measurement gap based at least in part on the indication that the channel is classified as static.

Aspect 23: The method of any of Aspects 19 through 22, wherein the at least one optimization includes modifying a filtering, associated with measurements of the channel, based at least in part on the indication that the channel is classified as static.

Aspect 24: The method of any of Aspects 19 through 23, wherein the at least one optimization includes determining a mobility associated with the additional wireless communication device based at least in part on the indication that the channel is classified as static.

Aspect 25: The method of any of Aspects 19 through 24, wherein the at least one optimization includes reducing a threshold associated with beam switching based at least in part on the indication that the channel is classified as static.

Aspect 26: An apparatus for wireless communication at a device, comprising a processor; memory coupled with the processor; and instructions stored in the memory and executable by the processor to cause the apparatus to perform the method of one or more Aspects of Aspects 1-18.

Aspect 27: A device for wireless communication, comprising a memory and one or more processors coupled to the memory, the memory and the one or more processors configured to perform the method of one or more Aspects of Aspects 1-18.

Aspect 28: An apparatus for wireless communication, comprising at least one means for performing the method of one or more Aspects of Aspects 1-18.

Aspect 29: A non-transitory computer-readable medium storing code for wireless communication, the code comprising instructions executable by a processor to perform the method of one or more Aspects of Aspects 1-18.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-18.

Aspect 31: An apparatus for wireless communication at a device, comprising a processor; memory coupled with the processor; and instructions stored in the memory and executable by the processor to cause the apparatus to perform the method of one or more Aspects of Aspects 19-25.

Aspect 32: A device for wireless communication, comprising a memory and one or more processors coupled to the memory, the memory and the one or more processors configured to perform the method of one or more Aspects of Aspects 19-25.

Aspect 33: An apparatus for wireless communication, comprising at least one means for performing the method of one or more Aspects of Aspects 19-25.

Aspect 34: A non-transitory computer-readable medium storing code for wireless communication, the code comprising instructions executable by a processor to perform the method of one or more Aspects of Aspects 19-25.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 19-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device, comprising:
a memory; and
one or more processors coupled to the memory, the one or more processors configured to:
determine, based at least in part on two or more measurements on a channel taken at different points in time, that the channel is classified as static; and
perform at least one optimization based at least in part on determining that the channel is classified as static, wherein the at least one optimization includes at least one of:
reducing a periodicity associated with a measurement gap,
determining a mobility associated with the wireless communication device,
reducing a threshold associated with beam switching, or
refraining from performing at least one filtering at a radio frequency receiver.

2. The wireless communication device of claim 1, wherein the memory and the one or more processors are included in a user equipment on a cellular network, an access point on a wireless local area network (WLAN), a station on a WLAN, or a combination thereof.

3. The wireless communication device of claim 1, wherein classification as static is associated with an additive white Gaussian noise (AWGN) model, and classification as not static is associated with a tapped delay line (TDL) channel model.

4. The wireless communication device of claim 1, wherein the two or more measurements include reference signal received power (RSRP) measurements.

5. The wireless communication device of claim 1, wherein determining that the channel is classified as static is based at least in part on a variance associated with the two or more measurements.

6. The wireless communication device of claim 5, wherein the variance associated with the two or more measurements is determined using a sliding window.

7. The wireless communication device of claim 5, wherein the variance associated with the two or more measurements is determined using a hysteresis loop.

8. The wireless communication device of claim 5, wherein the variance associated with the two or more measurements is determined using a Welford filter.

9. The wireless communication device of claim 5, wherein the variance associated with the two or more measurements is determined using an infinite impulse response (IIR) filter.

10. The wireless communication device of claim 1, wherein the at least one optimization includes modifying a channel state feedback (CSF) procedure based at least in part on determining that the channel is classified as static.

11. The wireless communication device of claim 10, wherein modifying the CSF procedure includes selecting a different channel quality indicator (CQI) than a CQI selected when a channel is classified as not static.

12. The wireless communication device of claim 11, wherein the different CQI is selected using a different preconfigured table than a preconfigured table used when a channel is classified as not static.

13. The wireless communication device of claim 1, wherein the at least one optimization includes reducing a periodicity associated with a control loop, associated with at least one of a time adjustment, a frequency adjustment, or a power adjustment, based at least in part on determining that the channel is classified as static.

14. The wireless communication device of claim 1, wherein the at least one optimization includes modifying a filtering, associated with measurements of the channel, based at least in part on determining that the channel is classified as static.

15. A wireless communication device, comprising:
a memory; and
one or more processors coupled to the memory, the one or more processors configured to:
receive, from an additional wireless communication device, an indication that a channel, between the wireless communication device and the additional wireless communication device, is classified as static; and
perform at least one optimization based at least in part on the indication that the channel is classified as static, wherein the at least one optimization includes at least one of:
reducing a periodicity associated with a measurement gap,
determining a mobility associated with the wireless communication device,
reducing a threshold associated with beam switching, or
refraining from performing at least one filtering at a radio frequency receiver.

16. The wireless communication device of claim 15, wherein the memory and the one or more processors are included in a base station on a cellular network, an access point on a wireless local area network (WLAN), a station on a WLAN, or a combination thereof.

17. The wireless communication device of claim 15, wherein classification as static is associated with an additive white Gaussian noise (AWGN) model, and classification as not static is associated with a tapped delay line (TDL) channel model.

18. The wireless communication device of claim 15, wherein the at least one optimization includes modifying a filtering, associated with measurements of the channel, based at least in part on the indication that the channel is classified as static.

19. A method of wireless communication performed by a wireless communication device, comprising:
determining, based at least in part on two or more measurements on a channel taken at different points in time, that the channel is classified as static; and
performing at least one optimization based at least in part on determining that the channel is classified as static, wherein the at least one optimization includes at least one of:
reducing a periodicity associated with a measurement gap,
determining a mobility associated with the wireless communication device,
reducing a threshold associated with beam switching, or
refraining from performing at least one filtering at a radio frequency receiver.

20. The method of claim 19, wherein the at least one optimization includes modifying a channel state feedback (CSF) procedure based at least in part on determining that the channel is classified as static, and wherein modifying the CSF procedure comprises selecting a different channel quality indicator (CQI) than a CQI selected when a channel is classified as not static.

21. The method of claim 19, wherein the at least one optimization includes
reducing a periodicity associated with a control loop, associated with at least one of a time adjustment, a frequency adjustment, or a power adjustment, based at least in part on determining that the channel is classified as static.

22. The method of claim 19, wherein the at least one optimization includes
modifying a filtering, associated with measurements of the channel, based at least in part on determining that the channel is classified as static.

23. A method of wireless communication performed by a wireless communication device, comprising:
receiving, from an additional wireless communication device, an indication that a channel, between the wireless communication device and the additional wireless communication device, is classified as static; and
performing at least one optimization based at least in part on the indication that the channel is classified as static, wherein the at least one optimization includes at least one of:
reducing a periodicity associated with a measurement gap,
determining a mobility associated with the wireless communication device,
reducing a threshold associated with beam switching, or
refraining from performing at least one filtering at a radio frequency receiver.

24. The wireless communication device of claim 15, wherein the at least one optimization includes modifying a channel state feedback (CSF) procedure based at least in part on determining that the channel is classified as static.

25. The wireless communication device of claim 24, wherein modifying the CSF procedure includes selecting a different channel quality indicator (CQI) than a CQI selected when a channel is classified as not static.

26. The wireless communication device of claim 25, wherein the different CQI is selected using a different preconfigured table than a preconfigured table used when a channel is classified as not static.

27. The wireless communication device of claim 15, wherein the at least one optimization includes reducing a periodicity associated with a control loop, associated with at least one of a time adjustment, a frequency adjustment, or a power adjustment, based at least in part on determining that the channel is classified as static.

28. The method of claim 19, wherein classification as static is associated with an additive white Gaussian noise (AWGN) model, and classification as not static is associated with a tapped delay line (TDL) channel model.

29. The method of claim 19, wherein the two or more measurements include reference signal received power (RSRP) measurements.

30. The method of claim 19, wherein determining that the channel is classified as static is based at least in part on a variance associated with the two or more measurements.

* * * * *